(12) United States Patent
Ueno (10) Patent No.: US 10,498,950 B2
(45) Date of Patent: Dec. 3, 2019

(54) RECORDING CONTROL APPARATUS AND CONTROL METHOD OF RECORDING CONTROL APPARATUS

(71) Applicant: CANON KABUSHIKI KAISHA, Tokyo (JP)

(72) Inventor: Daiyu Ueno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/210,559

(22) Filed: Dec. 5, 2018

(65) Prior Publication Data
US 2019/0199913 A1   Jun. 27, 2019

(30) Foreign Application Priority Data
Dec. 26, 2017 (JP) .................. 2017-249422

(51) Int. Cl.
*H04N 5/232*   (2006.01)

(52) U.S. Cl.
CPC ... *H04N 5/23216* (2013.01); *H04N 5/232935* (2018.08); *H04N 5/232945* (2018.08)

(58) Field of Classification Search
CPC ............... H04N 5/232; H04N 5/23216; H04N 5/232945; H04N 5/232935
USPC .................................................. 348/333.02
See application file for complete search history.

(56) References Cited

U.S. PATENT DOCUMENTS

| | | | | |
|---|---|---|---|---|
| 5,521,638 A * | 5/1996 | Dezaki | ................. | G11B 31/006 348/208.15 |
| 8,260,125 B2 * | 9/2012 | Fukushima | ............... | H04N 5/85 386/332 |
| 8,339,478 B2 * | 12/2012 | Ishii | ....................... | H04N 5/232 348/231.99 |
| 8,515,237 B2 * | 8/2013 | Oikawa | ................. | H04N 5/232 348/231.99 |
| 8,810,687 B2 * | 8/2014 | Ishii | ....................... | H04N 5/232 348/231.3 |
| 8,971,689 B2 * | 3/2015 | Miyakawa | ............... | H04N 5/77 348/161 |
| 2005/0226592 A1 * | 10/2005 | Saitoh | ................. | G11B 27/034 386/241 |
| 2010/0328495 A1 * | 12/2010 | Ishii | ....................... | H04N 5/232 348/231.99 |

(Continued)

FOREIGN PATENT DOCUMENTS

JP  2012156587 A  8/2012

*Primary Examiner* — Pritham D Prabhakher
(74) *Attorney, Agent, or Firm* — Canon U.S.A., Inc. IP Division (57) ABSTRACT

A recording control apparatus includes a recording unit to record a moving image, a stop instruction unit to instruct the recording unit to stop, and a control unit. Based on that the recording of the moving image by the recording unit continues for a predetermined time, the control unit performs control to automatically stop recording of a moving image and display a receiving screen that receives an instruction for a moving image recorded most recently on a display. When a stop instruction is issued from the stop instruction unit before the recording of the moving image by the recording unit continues for the predetermined time, the control unit performs control to stop the recording of the moving image and shift to a recording standby screen without displaying the receiving screen on the display.

19 Claims, 8 Drawing Sheets

(56) References Cited

U.S. PATENT DOCUMENTS

| | | | |
|---|---|---|---|
| 2011/0013878 A1* | 1/2011 | Fukushima | H04N 5/85 386/224 |
| 2011/0116759 A1* | 5/2011 | Oikawa | H04N 5/232 386/226 |
| 2012/0301119 A1* | 11/2012 | Ishii | H04N 5/232 386/326 |
| 2016/0216871 A1* | 7/2016 | Stamatiou | G06F 3/04845 |
| 2017/0103397 A1* | 4/2017 | Chiu | G06Q 20/4014 |
| 2018/0005665 A1* | 1/2018 | Knutt | G11B 27/031 |
| 2018/0091728 A1* | 3/2018 | Brown | G06F 3/0485 |
| 2018/0373058 A1* | 12/2018 | Bostick | G02C 7/04 |

\* cited by examiner

RECORDING CONTROL APPARATUS AND CONTROL METHOD OF RECORDING CONTROL APPARATUS

BACKGROUND OF THE INVENTION

Field of the Invention

The present disclosure relates to a recording control apparatus, a control method of a recording control apparatus, and a recording medium.

Description of the Related Art

An apparatus has been known which can additionally write and record a moving image, which is newly captured and obtained, to a moving image included in an existing moving image file recorded in a recording medium Japanese Patent Laid-Open No. 2012-156587 discloses a moving image recording apparatus which automatically stops after recording a moving image for a predetermined time and displays a confirmation screen that can be selected by a user from among deletion or reproduction of a moving image recorded most recently, an additional write to a moving image recorded before the moving image recorded most recently, and recording as an independent file. However, the moving image recording apparatus of Japanese Patent Laid-Open No. 2012-156587 usually cannot stop the recording of moving image unless a predetermined time elapses although the moving image recording apparatus can stop the recording of moving image for error processing such as battery cover open.

Even if the recording of moving image can be interrupted by an instruction from the user, if a confirmation screen for a moving image recorded most recently is displayed after completion of the recording of moving image as in Japanese Patent Laid-Open No. 2012-156587, the next image capturing cannot be started unless selection is performed on the confirmation screen or the confirmation screen is closed. Therefore, there is an issue that the next image capturing cannot be quickly started and a chance of image capturing is lost. In particular, when the user intentionally stops the recording of moving image halfway, it is highly probable that the user recognizes that desired image capturing cannot be performed.

For example, a case is assumed where image capturing is performed for capturing a moving image of a baseball batter who swings a bat and hits a ball in six seconds by using a function to be able to record a moving image of six seconds as a predetermined time. In this case, it is assumed that the batter does not yet perform take back, which is an initial action of the swing, after about four seconds has elapsed since the recording of the batter who is at bat is started. In this state, even if the swing is performed from now on, it is not possible to capture a moving image of the entire swing until six seconds, so that it is assumed that the user once stops the recording and tries to restart the recording of six seconds. If the confirmation screen is displayed when the recording is intentionally stopped in this way, there is a risk that the batter performs swing while closing the confirmation screen and performing an operation to instruct start of the next recording, so that image capturing desired by the user cannot be performed.

SUMMARY OF THE INVENTION

When interrupting image capturing, the next image capturing can be quickly performed.

According to an aspect of the disclosure, a recording control apparatus includes a memory, and at least one processor to perform operations of the following: a recording unit configured to perform control to record a moving image, a stop instruction unit configured to instruct the recording unit to stop, and a control unit configured to perform control, wherein, based on that the recording of the moving image by the recording unit continues for a predetermined time, the control unit performs control to automatically stop recording of a moving image and display a receiving screen that receives an instruction for a moving image recorded most recently on a display, and wherein, when a stop instruction is issued from the stop instruction unit before the recording of the moving image by the recording unit continues for the predetermined time, the control unit performs control to stop the recording of the moving image and shift to a recording standby screen without displaying the receiving screen on the display.

Further features of the present disclosure will become apparent from the following description of embodiments (with reference to the attached drawings).

DESCRIPTION OF THE EMBODIMENTS

An embodiment of the present disclosure will be described in detail below with reference to the accompanying drawings.

It is to be noted that the following embodiment is merely one example for implementing the present disclosure and can be appropriately modified or changed depending on individual constructions and various conditions of apparatuses to which the present disclosure is applied. Thus, the present disclosure is in no way limited to the following embodiment.

Hereinafter, an embodiment of the present disclosure will be described with reference to the drawings.

First Embodiment

In the present embodiment, a case will be described where the recording control apparatus is a digital camera 100 (hereinafter referred to as a camera 100).

Figure 1:
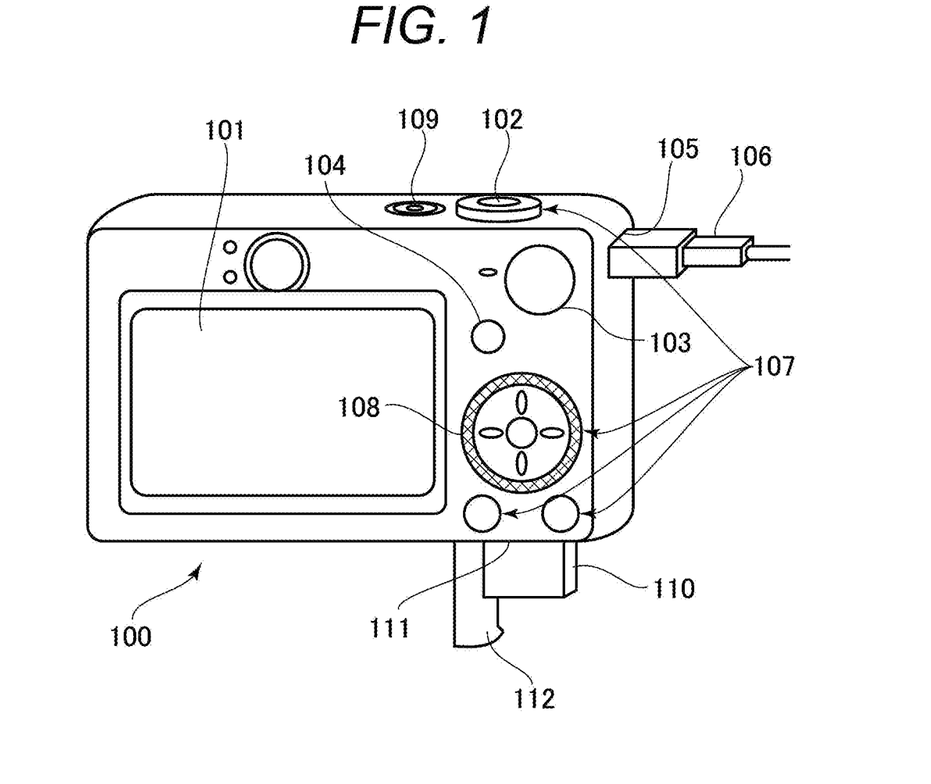
FIG. 1 is a diagram showing an example of an external appearance configuration of a digital camera.

FIG. 1 is a diagram showing an example of an external appearance configuration of the digital camera 100.

A display unit 101 displays a live view (LV) image, an image where a moving image is being recorded, and various information. The display unit 101 is an example of a display unit. A shutter button 102 is a button by which a user issues an image capturing instruction. A mode switching switch 103 is a switch by which the user switches various modes. A moving image button 104 is a button by which the user issues a moving image recording start instruction or a moving image recording stop instruction. A connector 105 is a connection section for connecting with a connection cable 106 for communicating with an external device such as a personal computer and a printer.

An operation unit 107 receives various operations from the user. The operation unit 107 includes operation members such as various switches and buttons, a touch panel, and a controller wheel 108. The controller wheel 108 is an operation member that can be rotatably operated. The controller wheel 108 is used when indicating a selection item along with a four-direction (up, down, left, and right) button.

A power switch 109 is a push button for switching between power on and power off. A recording medium 110 is a memory card, a hard disk, or the like. A recording medium slot 111 stores the recording medium 110. The recording medium 110 stored in the recording medium slot 111 can communicate with the camera 100 and can record and reproduce image data. The recording medium slot 111 is closed by a lid 112.

Figure 2:
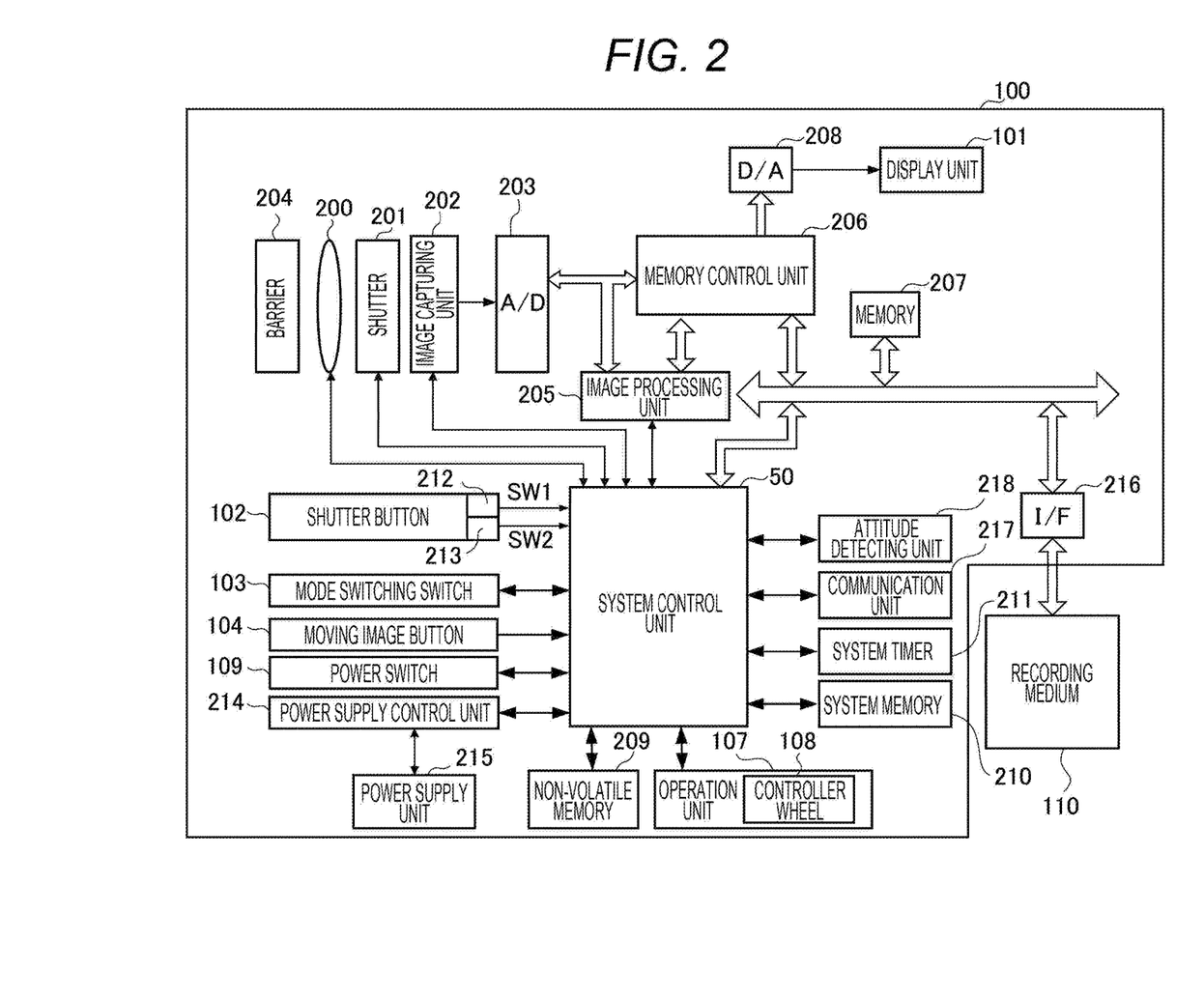
FIG. 2 is a diagram showing an example of a configuration of the digital camera.

FIG. 2 is a diagram showing an example of a configuration of the camera 100. The same components as those in FIG. 1 are denoted by the same reference numerals and the description thereof will be appropriately omitted.

An image capturing lens 200 is a lens group including a zoom lens and a focus lens. A shutter 201 has an aperture function. An image capturing unit 202 is an image capturing element composed of a CCD, a CMOS element, or the like, which converts an optical image of an object into an electrical signal. An A/D converter 203 convers an analog signal outputted from the image capturing unit 202 into a digital signal. A barrier 204 covers the image capturing lens 200 of the camera 100, so that the barrier 204 prevents an image capturing system including the image capturing lens 200, the shutter 201, and the image capturing unit 202 from being contaminated or damaged.

An image processing unit 205 performs resize processing such as predetermined pixel interpolation and reduction and color conversion processing on image data from the A/D converter 203 or image data from the memory control unit 206. Further, the image processing unit 205 performs predetermined calculation processing by using captured image data, and a system control unit 50 performs exposure control and range finding control based on an obtained calculation result. By the above processing, auto focus (AF) processing, auto exposure (AE) processing, and flash preliminary emission (EF) processing of through the lens (TTL) method are performed. Further, the image processing unit 205 performs predetermined calculation processing by using captured image data and performs automatic white balance (AWB) processing of TTL method based on an obtained calculation result.

The image data from the A/D converter 203 is directly written to a memory 207 through the image processing unit 205 and the memory control unit 206 or through the memory control unit 206. The memory 207 stores image data that is obtained by the image capturing unit 202 and converted into digital data by the A/D converter 203 and image data that is to be displayed on the display unit 101. The memory 207 has a storage capacity sufficient to store a predetermined number of still images and a predetermined time of moving image and sound. The memory 207 doubles as a memory (video memory) for displaying an image.

A D/A converter 208 converts image data for display stored in the memory 207 into an analog signal and supplies the analog signal to the display unit 101. Therefore, the image data for display written into the memory 207 is displayed by the display unit 101 through the D/A converter 208. The display unit 101 performs display on a display apparatus such as LCD according to the analog signal from the D/A converter 208. The D/A converter 208 analog-converts the digital signal, which is once A/D converted by the A/D converter 203 and accumulated in the memory 207, and the analog-converted signal is consecutively transferred to the display unit 101 and displayed by the display unit 101, so that a live view image is displayed. Therefore, the display unit 101 functions as an electronic viewfinder.

A non-volatile memory 209 is a memory used as an electrically erasable/recordable recording medium. For example, an EEPROM or the like is used as the non-volatile memory 209. The non-volatile memory 209 stores constants, a program, and the like for operation of the system control unit 50. The program is a program for executing a flowchart described later in the present embodiment.

The system control unit 50 has at least one processor or circuit and controls the entire camera 100. The system control unit 50 corresponds to an example of a control unit and a recording unit. The system control unit 50 realizes each processing of the present embodiment described later by executing the program stored in the non-volatile memory 209. The system control unit 50 also performs display control by controlling the memory 207, the D/A converter 208, the display unit 101, and the like. For example, RAM is used as a system memory 210. In the system memory 210, constants and variables for operation of the system control unit 50, the program read from the non-volatile memory 209, and the like are developed. A system timer 211 is a time measurement unit that measures time used for various controls and time of a built-in clock.

The mode switching switch 103, a first shutter switch 212, a second shutter switch 213, and the operation unit 107 are operation units for inputting various operation instructions to the system control unit 50.

The mode switching switch 103 can switch an operation mode to any one of a still image capturing mode, a moving image capturing mode, and a reproduction mode. The system control unit 50 sets an operation mode that is switched by the mode switching switch 103. As operation modes included in the still image capturing mode, there are an automatic image capturing mode, an automatic scene determination mode, a manual mode, various scene modes that are image capturing settings for each captured scene, a program AE mode, a custom mode, and the like. By the mode switching switch 103, it is possible to directly switch to any one of the above mentioned operation modes included in a menu button. After once switching to the still image capturing mode by using the mode switching switch 103, it is possible to switch to any one of the operation modes included in the menu button by using another operation member. As operation modes included in the moving image capturing mode, there are an additional moving image capturing mode described later and the like.

When the shutter button 102 is halfway operated, that is, when the shutter button 102 is half-depressed (image capturing preparation instruction), the first shutter switch 212 turns on and generates a first shutter switch signal SW1. By the first shutter switch signal SW1, the system control unit 50 starts an operation such as AF processing, AE processing, AWB processing, EF processing, or the like.

When the shutter button 102 is fully operated, that is, when the shutter button 102 is fully-depressed (image capturing instruction), the second shutter switch 213 turns on and generates a second shutter switch signal SW2. By the second shutter switch signal SW2, the system control unit 50 starts a series of operations from reading a signal from the image capturing unit 202 to writing image data into the recording medium 110.

When various display items displayed on the display unit 101 are selected and operated, a function is appropriately assigned to each operation member of the operation unit 107 for each scene, and the operation members operate as various function buttons. As the function buttons, for example, there are an end button, a return button, an image forward button, a jump button, a narrowing-down button, an attribute change button, and the like. For example, when the menu button is pressed, a menu screen where various settings can be performed is displayed on the display unit 101. A user can intuitively perform various settings by using the menu screen displayed on the display unit 101, the four-direction (up, down, left, and right) button, and a SET button.

When the user rotationally operates the controller wheel 108, an electrical pulse signal is generated according to an operation amount. The system control unit 50 controls each component of the camera 100 based on the generated pulse signal. By the generated pulse signal, the system control unit 50 can determine an angle and the number of rotations where the controller wheel 108 is rotationally operated. The controller wheel 108 need only be an operation member that can detect the rotational operation. For example, the controller wheel 108 may be a dial operation member where the controller wheel 108 itself rotates according to a rotational operation of the user and generates a pulse signal. Alternatively, the controller wheel 108 may be an operation member (touch wheel) composed of a touch sensor, which does not rotate and detects a rotational operation of a finger of the user on the controller wheel 108.

A power supply control unit 214 is composed of a battery detecting circuit, a DC-DC converter, a switch circuit that switches an energized block, and the like. The power supply control unit 214 detects the presence or absence of a battery, a type of the battery, and a remaining battery capacity. Further, the power supply control unit 214 controls the DC-DC converter based on results of the detection and an instruction from the system control unit 50 and supplies a required voltage to each component including the recording medium 110 for a required period of time. A power supply unit 215 is composed of a primary battery such as an alkaline battery and a lithium battery, a secondary battery such as a NiCd battery, a NiMH battery, and a Li battery, an AC adapter, and the like. A recording medium I/F 216 is an interface with the recording medium 110. The recording medium 110 is composed of a semiconductor memory, a magnetic disk, or the like.

A communication unit 217 connects with the outside through radio or a wired cable and transmits and receives a video signal, an audio signal, and the like. The communication unit 217 can connect to a wireless LAN and the Internet. Further, the communication unit 217 can transmit an image (including a live view image) captured by the image capturing unit 202 and image data recorded on the recording medium 110 and read image data and other various information from an external device.

An attitude detecting unit 218 detects an attitude of the camera 100 with respect to the antigravity direction. The system control unit 50 determines whether an image is captured when the camera 100 is horizontally held or when the camera 100 is vertically held based on attitude information detected by the attitude detecting unit 218. The system control unit 50 adds orientation information according to the attitude detected by the attitude detecting unit 218 to an image file of captured image data and/or rotates and records the image. Further, the attitude detecting unit 218 also detects motion (panning, tilting, lifting, whether the camera 100 is stationary, and the like) of the camera 100. An acceleration sensor, a gyro sensor, or the like is used as the attitude detecting unit 218.

Next, processing of additional moving image capturing in the moving image capturing mode of the camera 100 of the present embodiment will be described with reference to flowcharts of FIGS. 3 and 4 described later. Here, the additional moving image capturing is image capturing that can additionally write a moving image (video snap) captured in an image capturing time of several seconds into a moving image file that has been already recorded. In the additional moving image capturing, recording of the moving image is automatically stopped when a set image capturing time continues.

Figure 3:
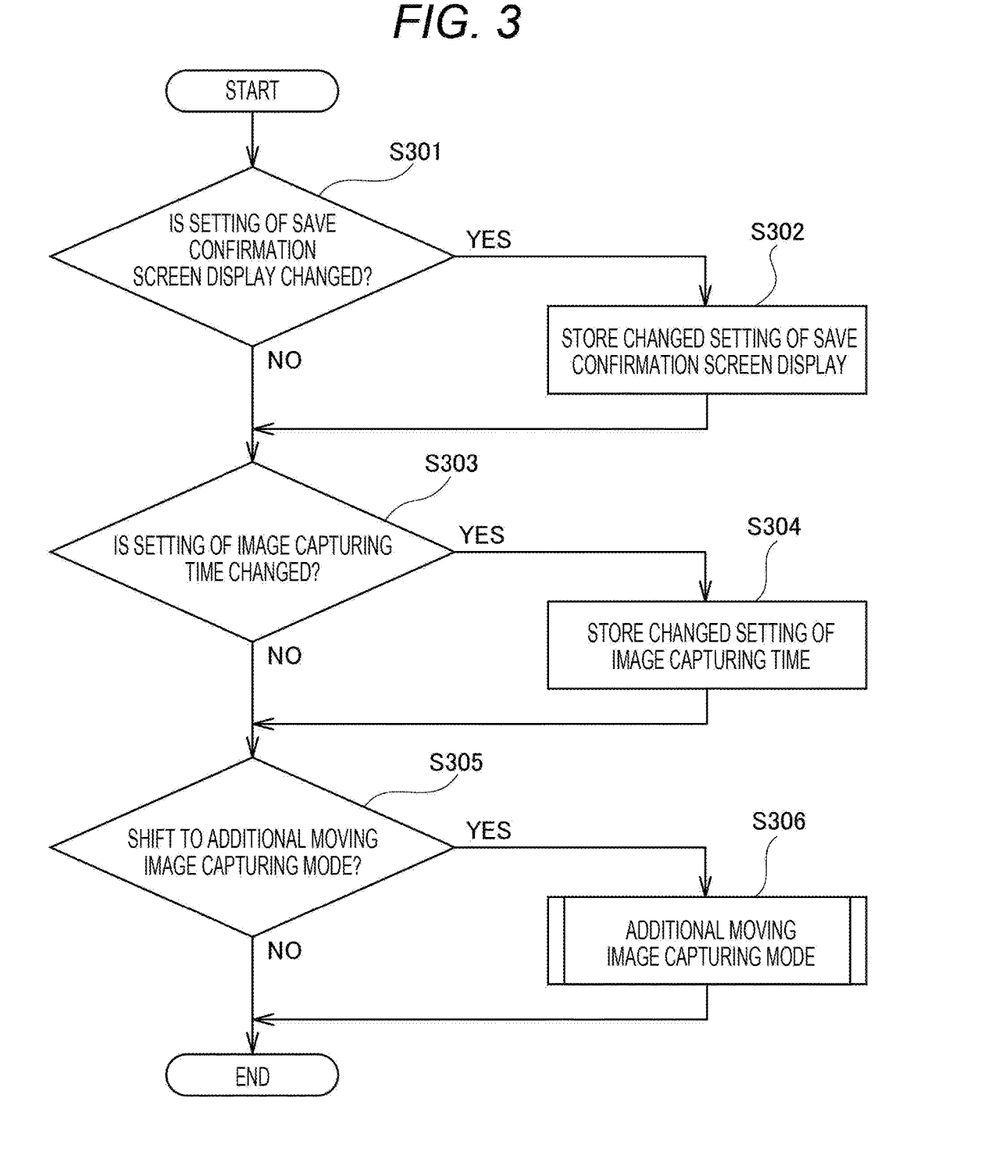
FIG. 3 is a flowchart showing an example of processing of additional moving image capturing.

Each processing in the flowchart of FIG. 3 is realized when the system control unit 50 develops the program stored in the non-volatile memory 209 in the system memory 210 and executes the program. The flowchart of FIG. 3 is started when the user performs an operation to open a setting menu of the additional moving image capturing of the moving image capturing mode.

In S301, the system control unit 50 determines whether or not a setting of save confirmation screen display is changed. Specifically, the system control unit 50 determines whether or not a setting is changed from display to non-display or changed from non-display to display in a setting item for determining whether or not to display a save confirmation screen from a setting menu of the additional moving image capturing. When the setting of the save confirmation screen display is changed, the system control unit 50 proceeds to S302, and when the setting is not changed, the system control unit 50 proceeds to S303.

Here, the setting menu of the additional moving image capturing will be described with reference to FIG. 5.

Figure 5:
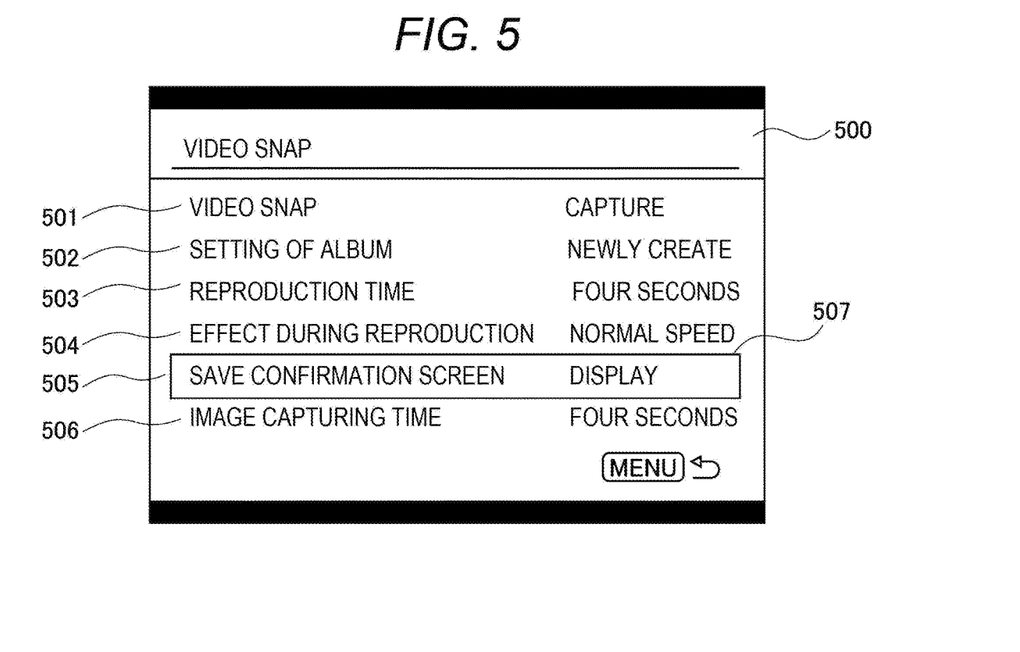
FIG. 5 is a diagram showing an example of a setting menu screen.

FIG. 5 is a diagram showing an example of a setting menu screen 500 of the additional moving image capturing. In the setting menu screen 500, a plurality of setting items 501 to 506 are displayed. The system control unit 50 reads a previous setting or a predetermined initial value stored in the non-volatile memory 209, stores them into the system memory 210, and displays the setting items 501 to 506.

In the setting item 501, it is possible to set whether or not to capture a moving image (video snap). In the setting item 502, it is possible to set whether to newly generate a moving image file (album) where moving images are connected or additionally write a moving image to an existing moving image file. In the setting item 503, it is possible to set a reproduction time of a moving image. In the setting item 504, it is possible to set an effect when reproducing a moving image (for example, normal speed, double speed, and the like). In the setting item 505, it is possible to set whether or not to display the save confirmation screen. The setting item 505 corresponds to an example of a display setting unit. In the setting item 506, it is possible to set an image capturing time of a moving image. The setting item 506 corresponds to an example of a time setting unit. When the user changes a setting by moving a cursor 507 to a setting item desired to be changed by using the operation unit 107, the system control unit 50 changes display content of the setting item and displays the display content.

In S301 described above, the system control unit 50 determines whether the setting item 505 is changed from "the save confirmation screen: display" to "the save confirmation screen: non-display" or vice versa.

In S302, the system control unit 50 stores the changed setting of the save confirmation screen display. Specifically, the system control unit 50 updates the setting of the save confirmation screen display stored in the system memory 210. When the power of the camera 100 is turned off, the system control unit 50 stores the setting of the save confirmation screen display into the non-volatile memory 209, so that the system control unit 50 displays the setting read from the non-volatile memory 209 when the power of the camera 100 is turned on next time.

In S303, the system control unit 50 determines whether or not the setting of the image capturing time is changed. Specifically, in the setting item 506 of FIG. 5, the system control unit 50 determines whether or not the number of seconds of the "image capturing time" is changed. In the present embodiment, it is possible to select any of the following as the image capturing time: two seconds, four seconds, six seconds, and eight seconds. Regarding the image capturing time, the user may input an arbitrary number of seconds in addition to the numbers of seconds that can be selected. When the setting of the image capturing time is changed, the system control unit 50 proceeds to S304, and when the setting is not changed, the system control unit 50 proceeds to S305.

In S304, the system control unit 50 stores the changed setting of the image capturing time. Specifically, the system control unit 50 updates the setting of the image capturing time stored in the system memory 210. When the power of the camera 100 is turned off, the system control unit 50 stores the setting of the image capturing time into the non-volatile memory 209, so that the system control unit 50 displays the image capturing time read from the non-volatile memory 209 when the power of the camera 100 is turned on next time.

In S305, the system control unit 50 determines whether or not to shift to the additional moving image capturing mode. Specifically, the system control unit 50 determines to shift to the additional moving image capturing mode when an operation to move to an image capturing standby screen is performed in a state where "video snap: captured" is set in the setting item 501 of FIG. 5. When shifting to the additional moving image capturing mode, the system control unit 50 proceeds to S306, and when not shifting to the additional moving image capturing mode, the system control unit 50 ends the processing of the flowchart of FIG. 3.

S306 is processing of the additional moving image capturing mode and will be described with reference to the flowchart of FIG. 4.

Figure 4:
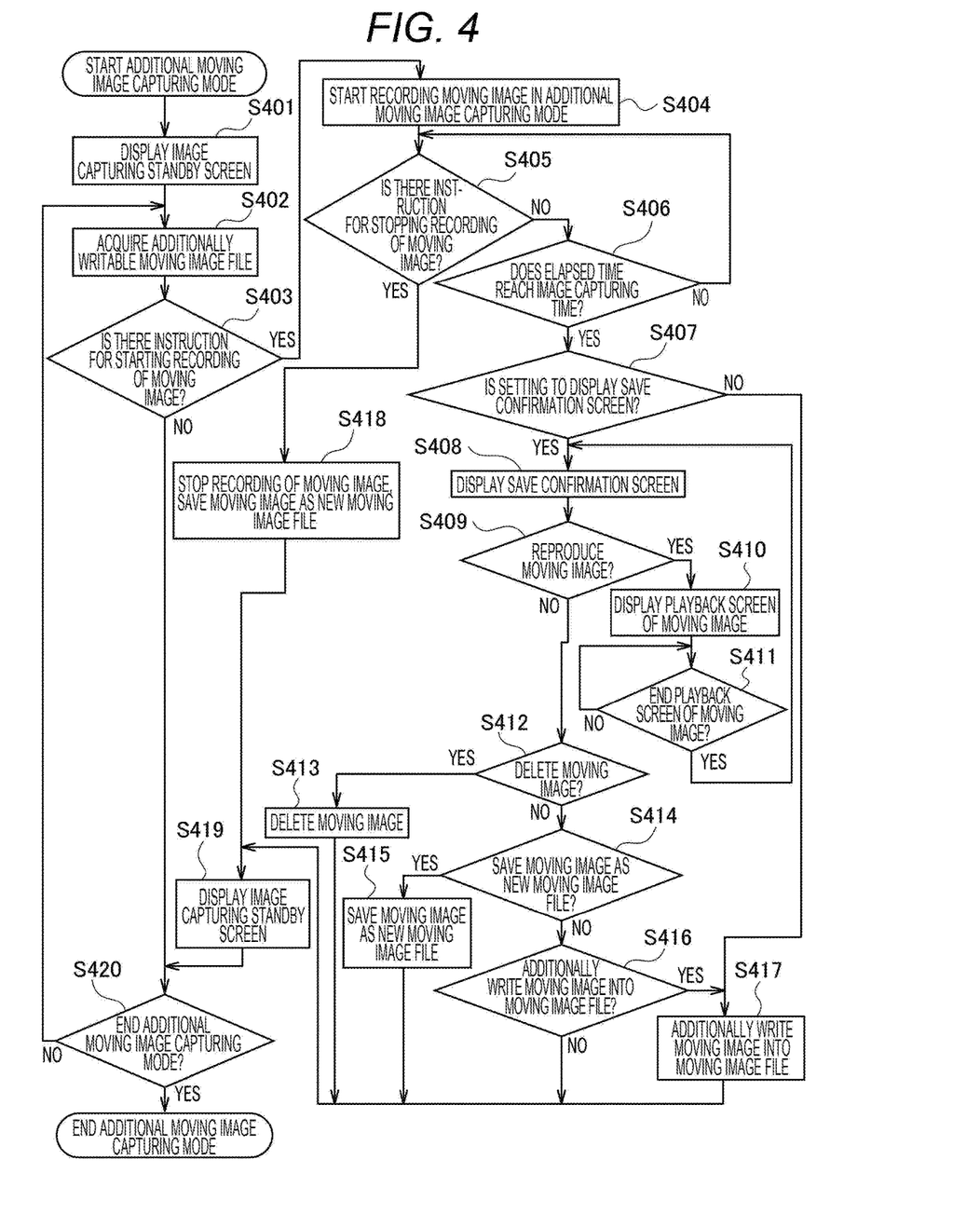
FIG. 4 is a flowchart showing an example of processing of additional moving image capturing mode.

Each processing in the flowchart of FIG. 4 is realized when the system control unit 50 develops the program stored in the non-volatile memory 209 in the system memory 210 and executes the program.

In S401, the system control unit 50 displays the image capturing standby screen in the additional moving image capturing mode on the display unit 101.

Figure 6:
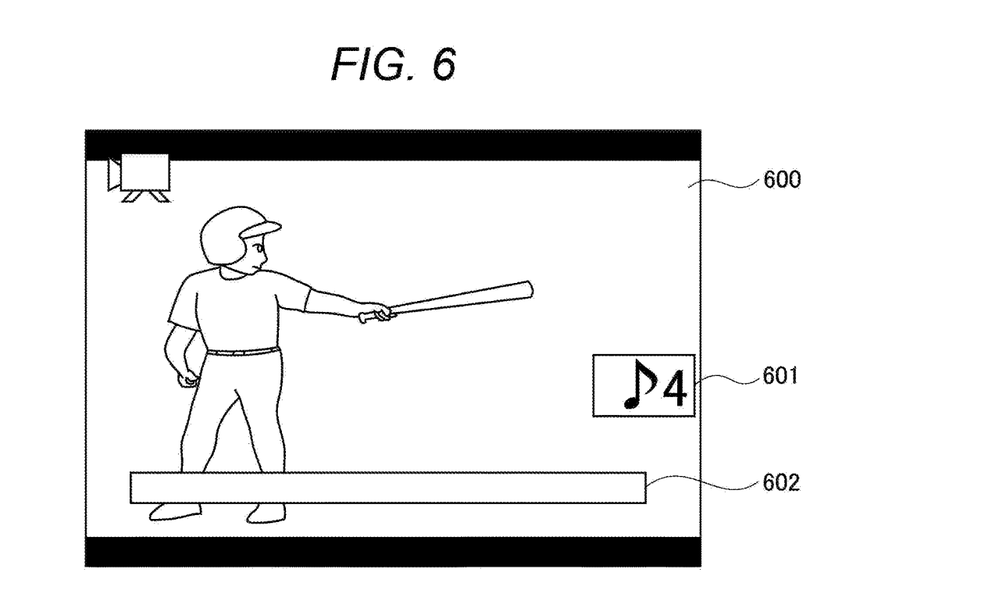
FIG. 6 is a diagram showing an example of an image capturing standby screen.

FIG. 6 is a diagram showing an example of an image capturing standby screen 600 in the additional moving image capturing mode.

On the image capturing standby screen 600, an image capturing time display section 601 and a progress display section 602 are displayed on a live view image in a superimposed manner. The image capturing time is displayed in the image capturing time display section 601. The system control unit 50 displays the currently set image capturing time in the image capturing time display section 601. The progress of the additional moving image capturing is displayed in the progress display section 602. The image capturing standby screen 600 corresponds to an example of a recording standby screen.

In S402, the system control unit 50 acquires an additionally writable moving image file from the recording medium 110. The reason to acquire the moving image in this way is to additionally write a moving image recorded in the additional moving image capturing mode into the acquired moving image file.

In S403, the system control unit 50 determines whether or not an operation for instructing start of recording of a moving image is performed. Specifically, when the moving image button 104 is pressed, the system control unit 50 determines that the operation for instructing start of recording of a moving image is performed. Here, the moving image button 104 corresponds to an example of an recording instruction unit. When the operation for instructing start of recording of a moving image is performed, the system control unit 50 proceeds to S404, and when the operation for instructing start of recording of a moving image is not performed, the system control unit 50 proceeds to S420.

In S404, the system control unit 50 starts recording a moving image in the additional moving image capturing mode. Specifically, the system control unit 50 records the moving image into the memory 207.

Figure 7:
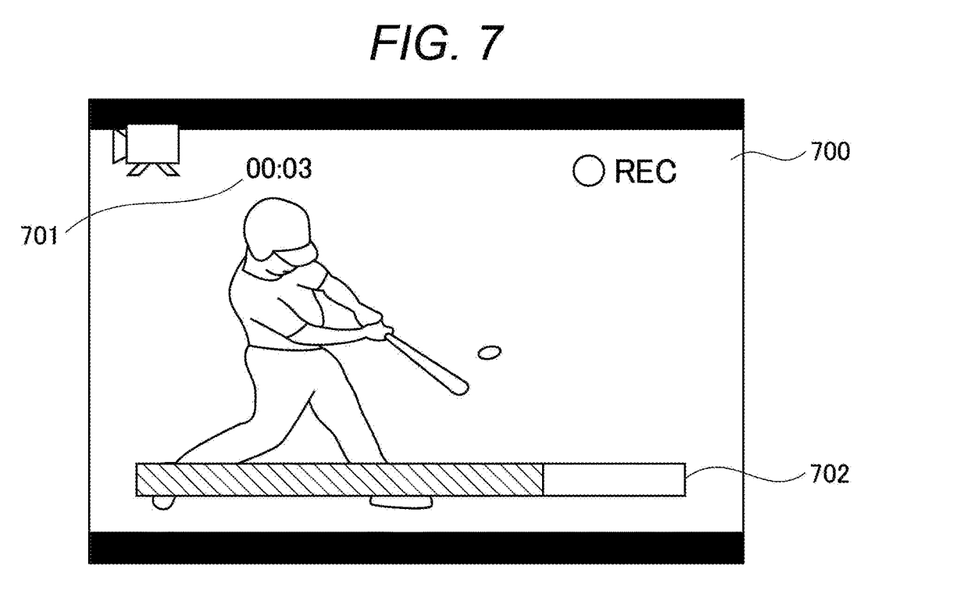
FIG. 7 is a diagram showing an example of a moving image recording screen.

FIG. 7 is a diagram showing an example of a moving image recording screen 700 in the additional moving image capturing mode.

On the moving image recording screen 700, an elapsed time display section 701 and a progress display section 702 are displayed on an image in a superimposed manner where the moving image is being recorded. In the elapsed time display section 701, an elapsed time since the recording of the moving image is started is displayed. In the progress display section 702, the progress of the additional moving image capturing is displayed. The system control unit 50 displays the elapsed time with respect to the set image capturing time in the progress display section 702 by using a progress bar.

In S405, the system control unit 50 determines whether or not an operation for instructing stop of the recording of the moving image is performed. Specifically, when the moving image button 104, which is the same as the button for instructing start of recording of the moving image, is pressed, the system control unit 50 determines that the operation for instructing stop of the recording of the moving image is performed. Here, the moving image button 104 corresponds to an example of a stop instruction unit. In this way, an operation member for instructing start of recording of the moving image and an operation member for instructing stop of recording of the moving image are the same member, so that even when a moving image of several seconds is being recorded, the user can immediately instruct stop of the recording. The moving image button 104 is not limited to a physical button, but may be a touchable button displayed on the display unit 101.

When the operation for instructing stop of the recording of the moving image is not performed, the system control unit 50 proceeds to S406, and when the operation for instructing stop of the recording of the moving image is performed, the system control unit 50 proceeds to S418.

In S406, the system control unit 50 determines whether or not the elapsed time since the recording of the moving image is started reaches the set image capturing time. When the elapsed time reaches the image capturing time, the system control unit 50 proceeds to S407, and when the elapsed time does not reach the image capturing time, the system control unit 50 returns to S405.

In S407, the system control unit 50 determines whether or not the setting of the save confirmation screen is to display the save confirmation screen. Specifically, the system control unit 50 determines whether or not the setting of the save confirmation screen is to display the save confirmation screen based on information stored in the system memory 210. When the setting is to display the save confirmation screen, the system control unit 50 proceeds to S408, and when the setting is not to display the save confirmation screen, the system control unit 50 proceeds to S417.

In S408, the system control unit 50 displays the save confirmation screen on the display unit 101. The save confirmation screen is an example of a receiving screen.

Figure 8:
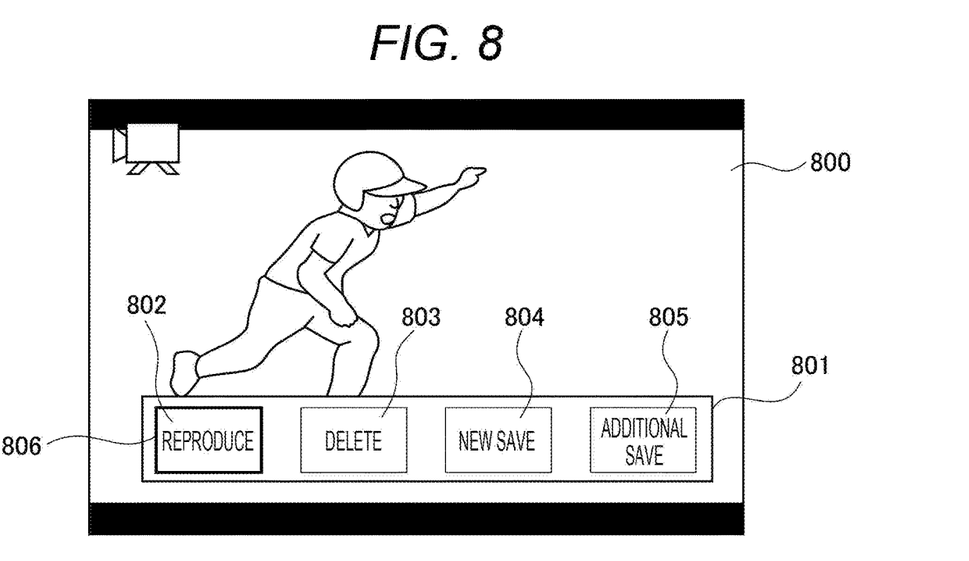
FIG. 8 is a diagram showing an example of a save confirmation screen.

FIG. 8 is a diagram showing an example of a save confirmation screen 800.

On the save confirmation screen 800, a save confirmation display section 801 is displayed on a live view image in a superimposed manner. In the save confirmation display section 801, a reproduce button 802, a delete button 803, a new save button 804, and an additional save button 805 are displayed. The reproduce button 802 is a button to be selected when reproducing a moving image recorded most recently. The delete button 803 is a button to be selected when deleting a moving image recorded most recently. The new save button 804 is a button to be selected when recording a moving image recorded most recently into the recording medium 110 as an independent new moving image file. The additional save button 805 is a button to be selected when additionally writing a moving image recorded most recently into an additionally writable moving image file.

In response to an operation where the user moves a cursor 806 to a button to be selected and confirms the button by using the operation unit 107, the system control unit 50 acquires information of the button selected by the user.

In S409, the system control unit 50 determines whether or not to reproduce a moving image recorded most recently. Specifically, when the reproduce button 802 of the save confirmation display section 801 is selected by the user, the system control unit 50 determines to reproduce the moving image recorded most recently. When reproducing the moving image, the system control unit 50 proceeds to S410, and when not reproducing the moving image, the system control unit 50 proceeds to S412.

In S410, the system control unit 50 displays a playback screen of the moving image recorded most recently on the display unit 101. Therefore, the user can confirm whether a desired image is recorded.

In S411, the system control unit 50 determines whether or not to end the playback screen of the moving image recorded most recently. Specifically, when the user performs an operation to end the playback screen by using the operation unit 107, the system control unit 50 determines to end the playback screen. When not ending the playback screen, the system control unit 50 waits for end of the playback screen, and when ending the playback screen, the system control unit 50 returns to S408.

In S412, the system control unit 50 determines whether or not to delete the moving image recorded most recently. Specifically, when the delete button 803 of the save confirmation display section 801 is selected by the user, the system control unit 50 determines to delete the moving image recorded most recently. When deleting the moving image, the system control unit 50 proceeds to S413, and when not deleting the moving image, the system control unit 50 proceeds to S414.

In S413, the system control unit 50 deletes the moving image recorded most recently. Therefore, when the user could not record a desired moving image, the user can delete the moving image. Thereafter, the system control unit 50 proceeds to S419.

In S414, the system control unit 50 determines whether or not to save the moving image recorded most recently as an independent new moving image file. Specifically, when the new save button 804 of the save confirmation display section 801 is selected by the user, the system control unit 50 determines to save the moving image recorded most recently as an independent new moving image file. When saving the moving image as an independent new moving image file, the system control unit 50 proceeds to S415, and when not saving the moving image as an independent new moving image file, the system control unit 50 proceeds to S416.

In S415, the system control unit 50 saves the moving image recorded most recently in the recording medium 110 as an independent new moving image file. Here, the system control unit 50 saves the moving image recorded most recently as an additionally writable moving image file. Thereafter, the system control unit 50 proceeds to S419.

In S416, the system control unit 50 determines whether or not to additionally write the moving image recorded most recently into an additionally writable moving image file. Specifically, when the additional save button 805 of the save confirmation display section 801 is selected by the user, the system control unit 50 determines to save the moving image recorded most recently by additionally writing the moving image recorded most recently into an additionally writable moving image file. When saving the moving image by additionally writing the moving image, the system control unit 50 proceeds to S417, and when not saving the moving image without additionally writing the moving image, the system control unit 50 proceeds to S419.

In S417, the system control unit 50 additionally writes the moving image recorded most recently into the additionally writable moving image file acquired in S402. Therefore, a moving image file where moving images of short image capturing time are connected is created. When the setting is not to display the save confirmation screen in S407 described above, the system control unit 50 proceeds to S417 as well. In this case, the system control unit 50 additionally writes the moving image recorded most recently into the additionally writable moving image file without displaying the save confirmation screen. Thereafter, the system control unit 50 proceeds to S419.

Next, a case will be described where the operation for instructing stop of the recording of the moving image is performed in S405 described above and thereby the system control unit 50 proceeds to S418. Here, the case where the system control unit 50 proceeds to S418 is a case where the user issues a moving image recording stop instruction before the elapsed time since the recording of the moving image is started reaches the set image capturing time, so that it is assumed that the user highly likely recognizes that a desired moving image cannot be recorded.

In S418, the system control unit 50 stops recording the moving image and saves the recorded moving image into the recording medium 110 as an independent new moving image file. In other words, even when the setting of the save confirmation screen is to display the save confirmation screen, the system control unit 50 does not display the save confirmation screen. The moving image file saved here may be a moving image that is not desired by the user, so that it is preferable that the system control unit 50 saves the moving image file as a moving image file that cannot be additionally written. In other words, in S402 described above, it is preferable that the system control unit 50 does not acquire the moving image file that is saved in S418 as an additionally writable moving image file.

In S419, the system control unit 50 displays the image capturing standby screen in the additional moving image capturing mode on the display unit 101.

Here, when assuming a case of proceeding from S418 to S419 described above, it is highly probable that the user recognizes that a desired moving image has not been recorded in S418, so that the user has to wait for next chance of image capturing. In other words, when the save confirmation screen is not displayed in S418 and the image capturing standby screen is directly displayed in S419, the user can prepare for the next chance of image capturing. Therefore, even when interrupting image capturing, the user can quickly perform next image capturing.

In S420, the system control unit 50 determines whether or not to end the additional moving image capturing mode. Specifically, the system control unit 50 determines to end the additional moving image capturing mode when the user performs an operation to end the additional moving image capturing mode by using the operation unit 107. When not ending the additional moving image capturing mode, the system control unit 50 returns to S402, and when ending the additional moving image capturing mode, the system control unit 50 ends the flowchart of FIG. 4 and returns to the flowchart of FIG. 3.

As described above, according to the present embodiment, when a stop instruction is issued from the user before the recording of the moving image continues for a predetermined time, the system control unit 50 stops the recording of the moving image and performs control so that the screen shifts to the image capturing standby screen without displaying the save confirmation screen as a receiving screen. Therefore, the screen shifts to the image capturing standby screen without the save confirmation screen being operated by the user, so that even when interrupting the image capturing, the user can quickly perform the next image capturing.

Next, moving image files created when a moving image is additionally written to a moving image file after the elapsed time since the recording of the moving image is started reaches the image capturing time and when the recording of the moving image is stopped before the elapsed time reaches the image capturing time will be described with reference to FIGS. 9A, 9B, 10A, and 10B.

Figure 9A:
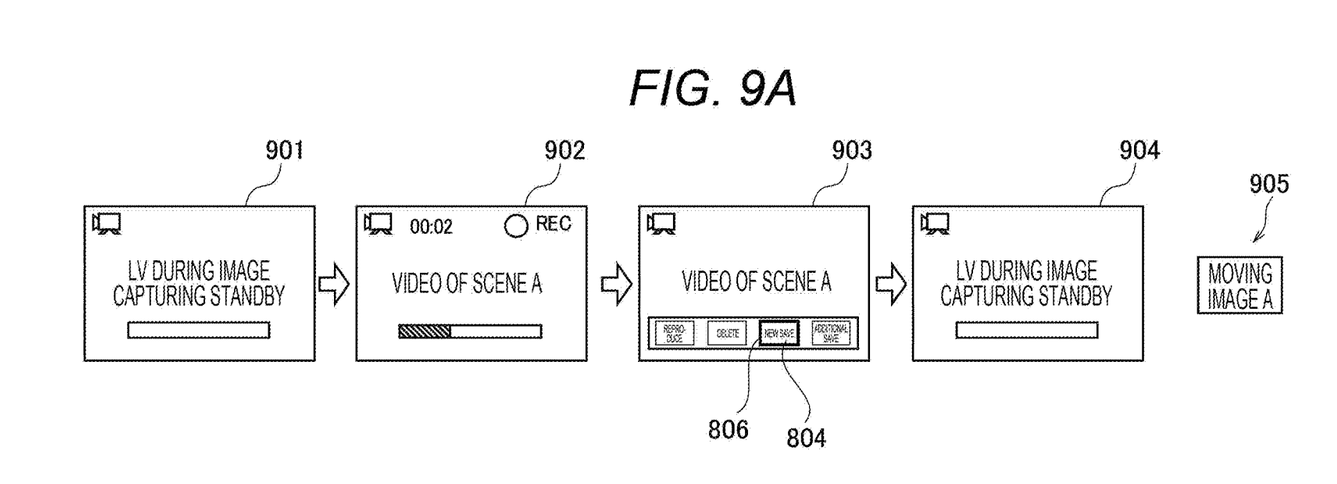
FIGS. 9A and 9B are diagrams showing examples of screens that shift when a moving image is recorded.

FIG. 9A is a diagram showing an example of screens that shift when a moving image of a scene A is recorded in first image capturing.

In FIG. 9A, the elapsed time reaches the image capturing time from an image capturing standby screen 901 through a moving image recording screen 902, so that the recording of the moving image is automatically stopped and a save confirmation screen 903 is displayed. Here, the user selects the new save button 804 on the save confirmation screen 903, so that the screen returns to an image capturing standby screen 904 and a moving image file 905 of the recorded moving image A is created.

Figure 9B:
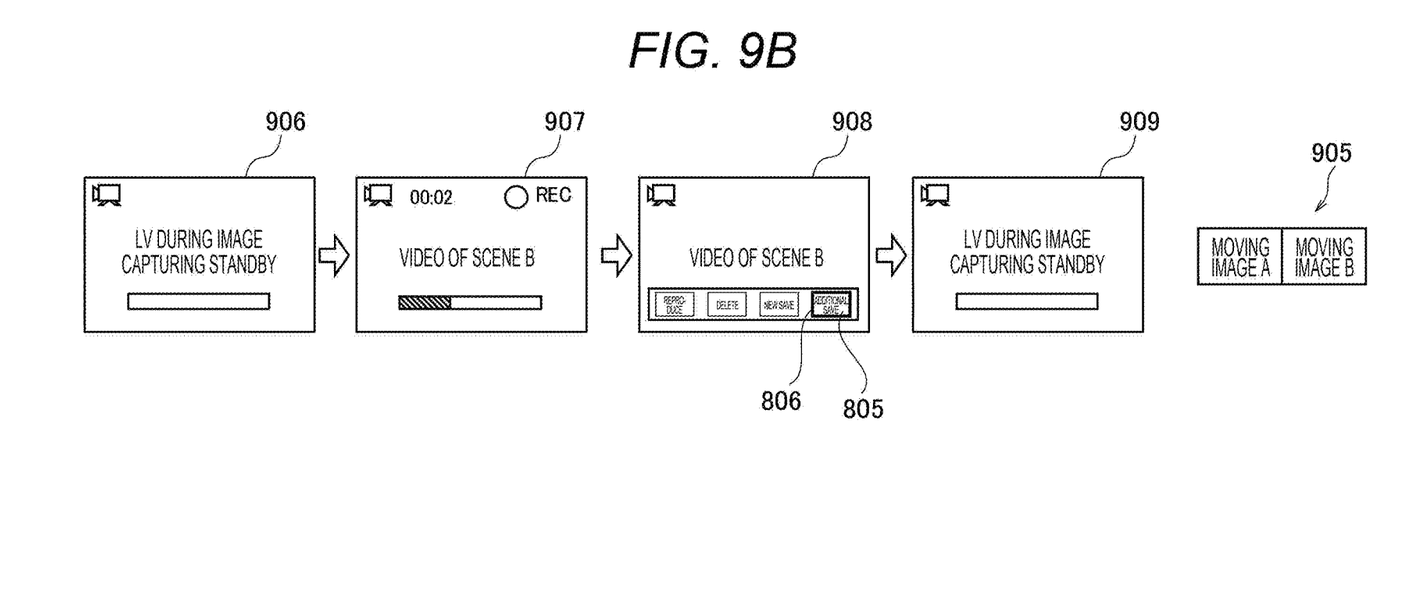

FIG. 9B is a diagram showing an example of screens that shift when a moving image of a scene B is recorded in second image capturing.

In FIG. 9B, the elapsed time reaches the image capturing time from an image capturing standby screen 906 through a moving image recording screen 907, so that the recording of the moving image is automatically stopped and a save confirmation screen 908 is displayed. Here, the user selects the additional save button 805 on the save confirmation screen 908, so that the screen returns to an image capturing standby screen 909 and the recorded moving image B is additionally written to the moving image file 905 including the moving image A.

Figure 10A:
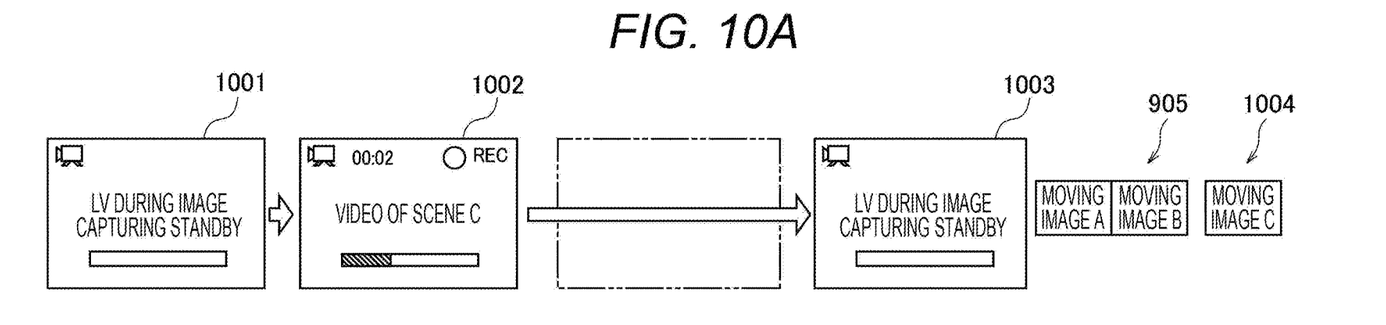
FIGS. 10A and 10B are diagrams showing examples of screens that shift when a moving image is recorded.

FIG. 10A is a diagram showing an example of screens that shift when a moving image of a scene C is recorded in third image capturing and the recording is stopped halfway.

In FIG. 10A, when the recording of the moving image is stopped by a stop instruction issued from the user before the elapsed time reaches the image capturing time from an image capturing standby screen 1001 through a moving image recording screen 1002, no save confirmation screen is displayed and an image capturing standby screen 1003 is quickly displayed. Further, a moving image file 1004 of a new moving image C independent from the moving image file 905 including the moving image A and the moving image B is created.

Figure 10B:
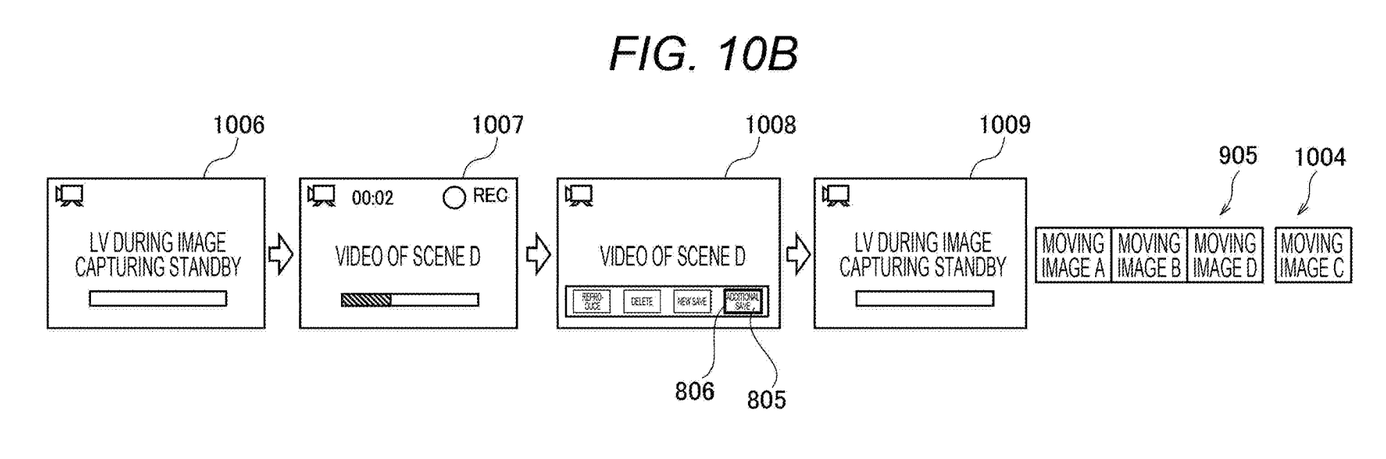

FIG. 10B is a diagram showing an example of screens that shift when a moving image of a scene D is recorded in fourth image capturing.

In FIG. 10B, the elapsed time reaches the image capturing time from an image capturing standby screen 1006 through a moving image recording screen 1007, so that the recording of the moving image is automatically stopped and a save confirmation screen 1008 is displayed. Here, the user selects the additional save button 805 on the save confirmation screen 1008, so that the screen returns to an image capturing standby screen 1009 and the recorded moving image D is additionally written to the moving image file 905 including the moving image A and the moving image B.

In this way, the save confirmation screen is not displayed when the recording is stopped halfway during the third image capturing in FIG. 10A, so that the user can quickly perform the fourth image capturing in FIG. 10B. By the way, processing time is required to connect (additionally record) the moving image to the moving image file. Therefore, when the recording is stopped halfway during the third image capturing in FIG. 10A, the moving image is not additionally written to the moving image file but a new moving image file is created, so that it is possible to save the processing time to connect the moving image, and the next image capturing can be quickly performed.

When the elapsed time reaches the image capturing time and thereby the recording of the moving image is automatically stopped, the system control unit 50 stops the recording of the moving image at an appropriate position in Group of picture (GOP) units. It is possible to additionally write the next moving image within a relatively short time into a moving image file of moving images recorded in GOP units. On the other hand, when the recording of the moving image is stopped by a stop instruction issued from the user before the elapsed time reaches the image capturing time, the system control unit 50 immediately stops the recording of the moving image without waiting for a boundary between GOP units. Therefore, the next image capturing can be more quickly performed.

When additionally writing another moving image into a moving image that is not recorded in GOP units, the system control unit 50 needs to adjust GOP, so that more time is required. A configuration is assumed where the moving image in the fourth image capturing in FIG. 10B is additionally written to the moving image C (a moving image that is not recorded in GOP units) whose recording is stopped halfway during the third image capturing in FIG. 10A described above. In this case, the system control unit 50 needs to adjust GOP of the moving image C, so that it takes time to additionally write the moving image D and it takes time until the moving image E can be captured in fifth image capturing. Therefore, there is a risk of losing a chance of image capturing in the fifth image capturing. Thus, as in the present embodiment, the moving image whose recording is stopped by a stop instruction issued from the user before the elapsed time reaches the image capturing time is made into an independent new moving image file, so that it is not necessary to adjust GOP and thereby the next image capturing can be quickly performed.

Here, a case will be described where the present embodiment is applied to the image capturing, which is described above in Description of the Related Art, including a period in which a batter swings a bat and hits a ball. The third image capturing in FIG. 10A described above corresponds to a case where the user once stops the recording in order to perform image capturing again by considering that the entire swing is not captured within the image capturing time because the batter does not perform an initial operation. In this case, the save confirmation screen is not displayed, so that it is possible to quickly proceed to the next image capturing. Therefore, a moving image of the swing of the batter can be captured from the beginning without losing a chance of image capturing. In other words, the moving image D in the fourth image capturing in FIG. 10B can include the swing of the batter. The moving image C in the third image capturing where the swing of the batter desired by the user is not recorded is not additionally written, so that no redundant moving image is additionally written and it is possible to obtain a moving image file where only moving images which meet user's purpose are connected.

While the present disclosure has been specifically described based on the embodiment, the present disclosure is not limited to the embodiment described above, and various embodiments that do not depart from the scope of the disclosure are included in the present disclosure. Further, the embodiment described above represents only an embodiment of the present disclosure, and can be appropriately changed.

The aforementioned various controls, which are performed by the system control unit 50 in the above description, may be performed by one hardware unit, or a plurality of hardware units (for example, a plurality of processors and circuits) may perform control of the entire apparatus by sharing processing.

In the embodiment described above, a case where the present disclosure is applied to a digital camera is described as an example. However, the present disclosure is not limited to this case, but the present disclosure can be applied to a recording control apparatus that automatically stops recording a moving image after the recording of the moving image continues for a predetermined time. That is, the present disclosure can be applied to a personal computer, a PDA, a mobile phone terminal, a portable type image viewer, a smartphone, a tablet PC, a digital photo frame, a music player, a game machine, and the like.

Further, the present disclosure is not limited to a digital camera body but can be also applied to a control apparatus that remotely controls an image capturing apparatus (including a network camera) by communicating with the image capturing apparatus through wired or wireless communication. Examples of the apparatus that remotely controls an image capturing apparatus include a smartphone, a tablet PC, and a desktop PC. It is possible to remotely control the image capturing apparatus by transmitting commands for causing the image capturing apparatus to perform various operations and settings from the control apparatus based on an operation performed on the control apparatus and processing performed on the control apparatus. Further, the control apparatus may receive a live view image captured by the image capturing apparatus through wired or wireless communication and display the live view image.

According to the present disclosure, when interrupting image capturing, it is possible to quickly perform next image capturing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{TM}$), a flash memory device, a memory card, and the like.

While the present disclosure has been described with reference to embodiments, it is to be understood that the disclosure is not limited to the disclosed embodiments. The scope of the following claims is to be accorded the broadest interpretation to encompass all such modifications and equivalent structures and functions.

This application claims the benefit of Japanese Patent Application No. 2017-249422, filed Dec. 26, 2017, which is hereby incorporated by reference herein in its entirety.

What is claimed is:

1. A recording control apparatus comprising:
   a memory; and
   at least one processor to perform operations of the following:
   a recording unit configured to perform control to record a moving image,
   a stop instruction unit configured to instruct the recording unit to stop, and
   a control unit configured to perform control, wherein, based on that the recording of the moving image by the recording unit continues for a predetermined time, the control unit performs control to automatically stop recording of a moving image and display a receiving screen that receives an instruction for a moving image recorded most recently on a display, and wherein, when a stop instruction is issued from the stop instruction unit before the recording of the moving image by the recording unit continues for the predetermined time, the control unit performs control to stop the recording of the moving image and shift to a recording standby screen without displaying the receiving screen on the display.

2. The recording control apparatus according to claim 1, wherein, when the control unit stops the recording of the moving image according to the stop instruction issued from the stop instruction unit before the recording of the moving image by the recording unit continues for a predetermined time, the control unit performs control to record the moving image, whose recording is stopped, as an independent moving image file.

3. The recording control apparatus according to claim 1, wherein, when the stop instruction is issued from the stop instruction unit before the recording of the moving image by the recording unit continues for a predetermined time, the control unit performs control to stop the recording of the moving image regardless of a boundary between GOP units.

4. The recording control apparatus according to claim 1,
wherein the at least one processor further is to perform operations of a recording instruction unit configured to instruct the recording unit to start recording of a moving image, and
wherein the stop instruction unit is the same operation member as the recording instruction unit.

5. The recording control apparatus according to claim 1, wherein, when the control unit automatically stops the recording of the moving image based on that the recording of the moving image by the recording unit continues for a predetermined time, the control unit performs control to additionally write the moving image recorded most recently into an additionally writable moving image file.

6. The recording control apparatus according to claim 1, wherein, when the control unit automatically stops the recording of the moving image based on that the recording of the moving image by the recording unit continues for a predetermined time, the control unit performs control not to additionally write the moving image recorded most recently into a moving image file that is created according to a stop instruction issued from the stop instruction unit before the recording of the moving image by the recording unit continues for a predetermined time.

7. The recording control apparatus according to claim 1, wherein the at least one processor further is to perform operations of a display setting unit configured to set whether or not to display the receiving screen when the recording of the moving image is automatically stopped based on that the recording of the moving image by the recording unit continues for a predetermined time.

8. The recording control apparatus according to claim 7, wherein, when the display setting unit performs setting not to display the receiving screen when the recording of the moving image is automatically stopped, the control unit performs control to additionally write the moving image recorded most recently into an additionally writable moving image file without displaying the receiving screen.

9. The recording control apparatus according to claim 1, wherein the at least one processor further is to perform operations of a time setting unit configured to set the predetermine time.

10. The recording control apparatus according to claim 9, wherein the time setting unit sets the predetermined time to time selected by a user or time inputted by the user.

11. The recording control apparatus according to claim 1, wherein the control unit is configured to perform processing selected by a user on the receiving screen.

12. A non-transitory computer-readable storage medium storing a program to cause a recording control apparatus to perform the method according to claim 11.

13. The recording control apparatus according to claim 1, wherein, when a user instructs deletion of a moving image on the receiving screen, the control unit performs control to delete the moving image recorded most recently.

14. The recording control apparatus according to claim 1, wherein, when a user instructs reproduction of a moving image on the receiving screen, the control unit performs control to reproduce the moving image recorded most recently.

15. The recording control apparatus according to claim 1, wherein, when a user instructs additional write to a moving image file on the receiving screen, the control unit performs control to additionally write the moving image recorded most recently into an additionally writable moving image file.

16. The recording control apparatus according to claim 1, wherein, when a user instructs recording as an independent moving image file on the receiving screen, the control unit performs control to record the moving image recorded most recently as an independent moving image file.

17. The recording control apparatus according to claim 1, wherein the control unit performs control to receive at least any one of the following: instructions of deletion of the moving image recorded most recently, reproduction of the moving image recorded most recently, additional write to an additionally writable moving image file, and recording as an independent moving image file on the receiving screen.

18. The recording control apparatus according to claim 1, further comprising an image sensor configured to capture an image of an object,
wherein the recording unit is configured to perform control to record a moving image captured by the image sensor.

19. A method for a recording control apparatus, the method comprising:
performing control to record a moving image;
instructing stop of the recording of a moving image; and
performing control,
wherein, based on that the recording of the moving image continues for a predetermined time, performing control includes performing control to automatically stop recording of a moving image and display a receiving screen that receives an instruction for a moving image recorded most recently on a display, and
wherein, when a stop instruction is issued before the recording of the moving image continues for the predetermined time, performing control includes performing control to stop the recording of the moving image and shift to a recording standby screen without displaying the receiving screen on the display.

* * * * *